(12) United States Patent
Phanco et al.

(10) Patent No.: US 6,843,747 B1
(45) Date of Patent: Jan. 18, 2005

(54) INTERNAL EXPANSION TANK FOR HYDROSTATIC TRANSAXLE

(75) Inventors: Eric S. Phanco, Decatur, IL (US); Kenneth J. Rawski, Charleston, IL (US); William H. Ward, Mahomet, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 0 days.

(21) Appl. No.: 10/062,734

(22) Filed: Jan. 31, 2002

(51) Int. Cl.[7] .............................................. F16H 57/04
(52) U.S. Cl. ...................................... 475/161; 74/606 R
(58) Field of Search ................................ 475/159, 160, 475/161; 74/606 R, 607; 184/85

(56) References Cited

U.S. PATENT DOCUMENTS

| | | |
|---|---|---|
| 1,840,874 A | 1/1932 | Rayburn |
| 3,654,761 A | 4/1972 | Eickmann |
| 3,969,876 A | 7/1976 | Turos |
| 4,468,981 A * | 9/1984 | Ries ............................. 475/159 |
| 4,889,621 A * | 12/1989 | Yamada et al. ............. 475/159 |
| 4,979,583 A | 12/1990 | Thoma et al. |
| 4,987,796 A | 1/1991 | von Kaler et al. |
| 5,090,949 A | 2/1992 | Thoma et al. |
| 5,201,692 A | 4/1993 | Johnson et al. |
| 5,259,194 A * | 11/1993 | Okada ........................... 60/456 |
| 5,373,697 A | 12/1994 | Jolliff et al. |
| 5,394,699 A | 3/1995 | Matsufuji |
| 5,515,747 A | 5/1996 | Okada et al. |
| 5,555,727 A | 9/1996 | Hauser et al. |
| 5,613,409 A | 3/1997 | Hauser |
| 5,622,051 A | 4/1997 | Iida et al. |
| 5,626,204 A | 5/1997 | Johnson |
| 5,644,954 A * | 7/1997 | Matsufuji ................. 74/606 R |
| 5,709,084 A | 1/1998 | Krantz |
| 5,802,851 A | 9/1998 | Krantz |
| 5,839,327 A * | 11/1998 | Gage ............................ 74/607 |
| 5,957,229 A | 9/1999 | Ishii |
| 6,073,443 A | 6/2000 | Okada et al. |
| 6,233,929 B1 | 5/2001 | Okada et al. |
| 6,280,613 B1 * | 8/2001 | Morse et al. ................ 475/159 |
| 6,341,489 B1 * | 1/2002 | Iida ............................... 60/487 |
| 2002/0173398 A1 * | 11/2002 | Arnold et al. ................ 475/72 |

FOREIGN PATENT DOCUMENTS

JP 3159822 7/1991

OTHER PUBLICATIONS

Photograph dated '96 3 4 of Model 310–3000 integrated hydrostatic transaxle.

* cited by examiner

*Primary Examiner*—Sherry Estremsky
(74) *Attorney, Agent, or Firm*—Neal, Gerber & Eisenberg, LLP

(57) ABSTRACT

An expansion chamber for a hydrostatic transaxle to provide for expansion of the hydraulic oil during operation of the transaxle, where the expansion chamber is formed as part of the housing inside the main sump by ribs or other members extending from the housing and is closed by a cap to form a sealed chamber. A siphon tube may be secured to the cap or integrally formed therein, or formed by additional cast ribs or similar features formed into the housing and also sealed by the cap.

18 Claims, 9 Drawing Sheets

FIG.I
(PRIOR ART)

INTERNAL EXPANSION TANK FOR HYDROSTATIC TRANSAXLE

BACKGROUND OF THE INVENTION

This invention relates to an expansion tank for use with a hydrostatic transaxle and more particularly an expansion tank formed internally to the transaxle.

Hydrostatic transaxles are known in the art and generally comprise a hydrostatic transmission in the same housing as output gearing and/or axles. U.S. Pat. No. 5,314,387 discloses a known integrated hydrostatic transaxle ("IHT") design, and shows a hydraulic pump receiving an input from a prime mover, hydraulic porting formed in a center section and a hydraulic motor connected to the pump through the porting. The motor drives an output shaft connected through gearing to a differential and output axles. Other transaxle designs are known in the art and can be used with this invention.

It is known to use an expansion tank with a hydrostatic transmission or IHT. One known design is to use an external tank that may be formed separate from the IHT housing or integrally therewith. An example of the latter design is shown in U.S. Pat. No. 5,314,387, which shows an expansion tank integrally formed as part of the upper housing, into which oil would expand as it heated, and which would then drain oil therefrom as it cooled. Such an expansion chamber would inherently be open to the atmosphere in order to work properly. Such prior art designs also use a siphon to move oil between the external expansion tank and the main sump. For example, the '387 patent also discloses mounting the expansion tank along the lower housing outside the differential gear and, given the level of oil in the main sump for the unit to operate properly, an expansion tank located at such a point would necessarily require the use of a siphon.

A further known design is shown in FIGS. 1 and 2, which show an integrated hydrostatic transaxle using an external expansion tank. This design was sold as a Model 310-3000 IHT, similar to that shown in U.S. Pat. No. 5,613,409, and therefore the internal workings of this IHT will not be discussed in detail. A main sump is formed inside the two primary casing portions 21 and 22 to retain the oil used by the hydrostatic transmission (not shown) and the gearing and differential (not shown), all of which are mounted internal to casings 21 and 22 and which drive output axles 23A and 23B.

An external expansion tank 25 is mounted on main casing 21 and secured thereto by means of a retention spring 26. A tube 28 in connected to main casing 21 through connector 29 and to expansion tank 25 through connector 27, with connectors 27 and 29 being right angle fittings with SAE straight thread O-ring and hose barb ends. Since the level of the expansion tank 25 is below that of the oil in the main sump, tube 28 forms a vacuum siphon with casings 21 and 22 to transfer oil to and from the expansion tank 25. As the oil is heated during operation of the IHT it would expand through tube 28 into expansion tank 25. As the oil cooled and contracted, oil would be forced from expansion tank 25 back into the main sump through tube 28 by a vacuum siphon effect. Air leaves or enters expansion tank 25 by means of breather vent 24 as oil expands into or contracts from expansion tank 25. Such a design has several drawbacks, however, including the need for locating and attaching a separate molded expansion tank on the outside of the housing, which increases costs and can present clearance issues and similar problems.

Another known design is the use of an internal expandable bellows, such as is shown in U.S. Pat. No. 4,987,796. As the oil pressure on the bellows changes due to expansion, the bellows collapses or enlarges the main sump area accordingly. This design also has significant drawbacks, including problems with maintaining flexibility of the bellows and the increased costs in adding such a unit to the IHT. Furthermore, if the bellows fails, the unit will leak oil, which may be hot, out of the transmission casing and will ultimately fail.

SUMMARY OF THE INVENTION

It is an object of the present invention to provide for an expansion tank chamber for use in a hydrostatic transaxle which eliminates the aforementioned problems of the prior art. In particular, it is an object of this invention to provide for an expansion tank located inside the casing of a hydrostatic transmission or transaxle and which uses a vacuum siphon to transfer oil between the expansion chamber and the main sump.

The expansion chamber is preferably formed as part of the housing inside the main sump and can be formed partially by ribs or similar members cast into and extending from the inner surface of the housing, where said members are closed by a cap to form a sealed chamber. The cap may have the siphon tube either secured thereto or integrally formed therein. In another embodiment, the siphon tube is formed by an additional cast rib or similar feature formed into the housing in cooperation with the cap.

Additional benefits and objects of this invention will be apparent from the following detailed description of exemplary embodiments with reference to the attached drawings and claims.

DETAILED DESCRIPTION OF THE DRAWINGS

Figure 1:
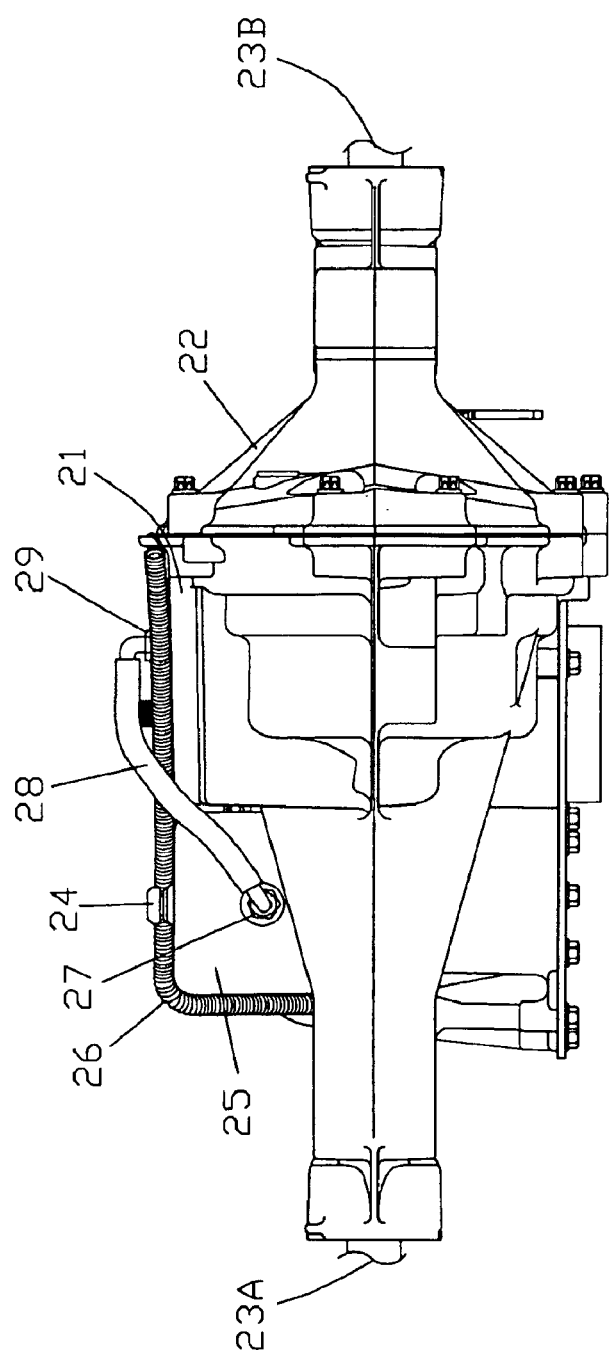
FIG. 1 is a back view of a prior art hydrostatic transaxle using a known external expansion tank design.
Figure 2:
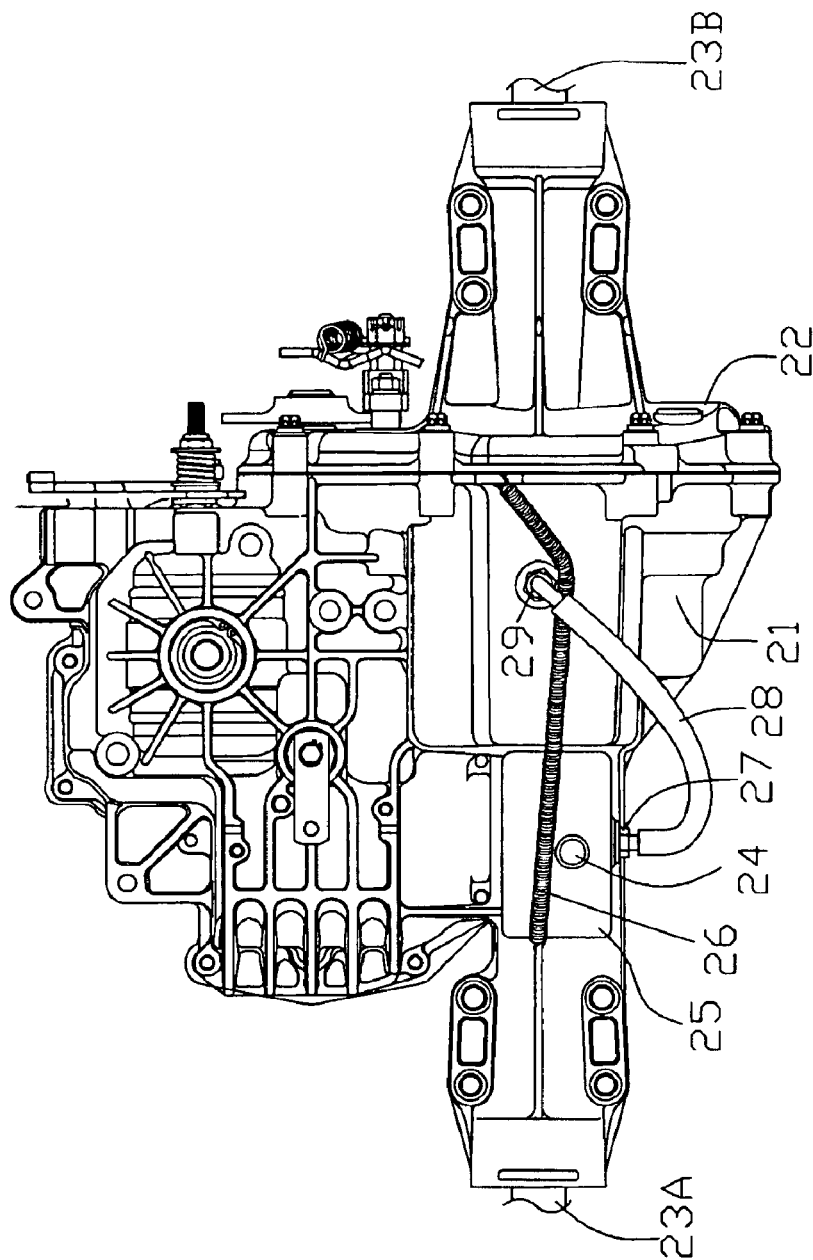
FIG. 2 is a top view of the prior art design of FIG. 1.
Figure 3:
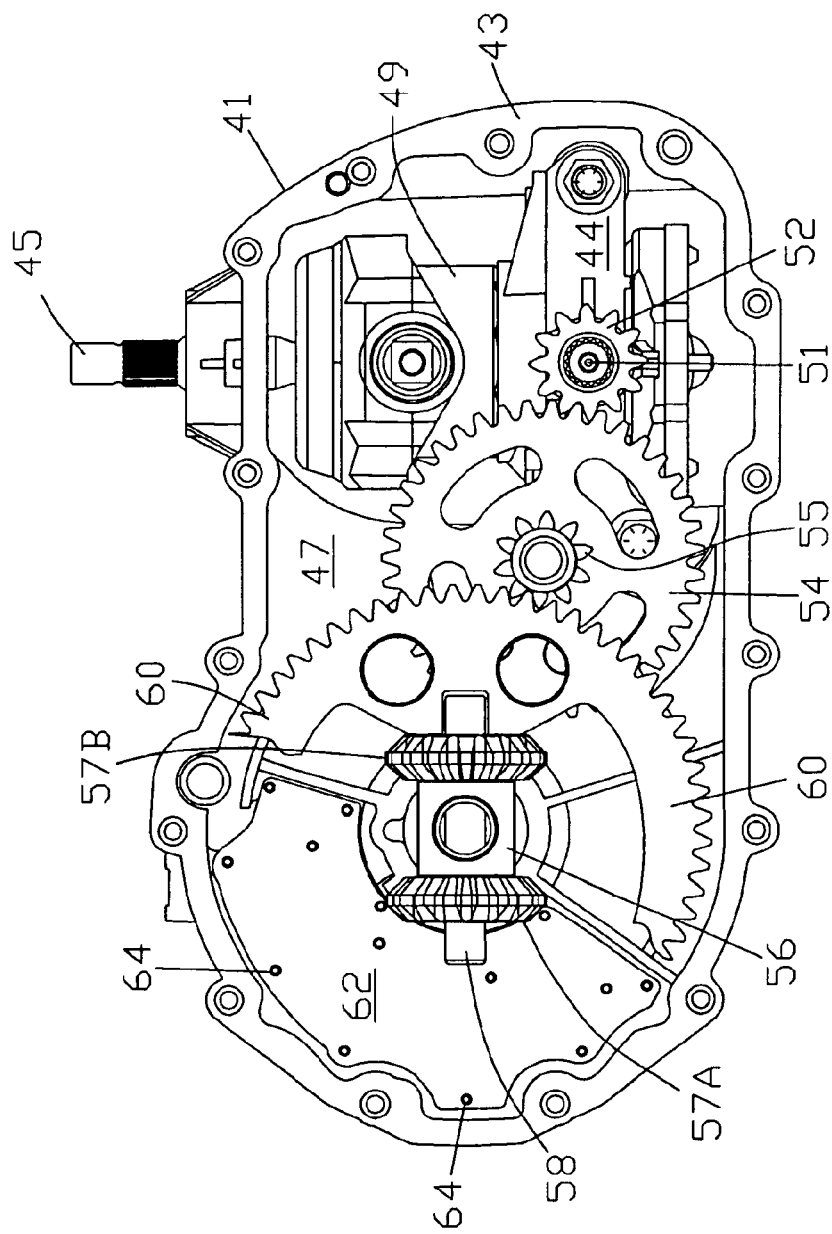
FIG. 3 is a side view of an embodiment of the present invention, showing one housing portion, the differential and gearing, with a portion of the gearing cut away.

A first embodiment of this invention is shown in FIG. 3, which shows the invention used in an IHT design similar to that shown in U.S. Pat. No. 6,122,996, the disclosure of which is incorporated herein by reference. The internal workings of the hydrostatic transmission will be generally understood. Housing 41 and a separate side housing (not shown) are joined together along sealing surface 43 to create a common sump 47. The hydrostatic transmission comprises a center section 44 having hydraulic porting formed therein to connect hydraulic pump 49 and a hydraulic motor (not shown). Input shaft 45 is driven by a prime mover (not shown) to rotate pump 49. Motor shaft 51 has gear 52 mounted thereon so that it cooperates with reduction gears 54 and 55 to drive differential input or bull gear 60. Bevel gears 57A and 57B, separated by block 56, rotate on cross shaft 58 with other elements not shown to provide rotational output to the vehicle axles. The hydrostatic transmission and gears are all mounted in sump 47. The specific arrangement or presence of such hydrostatic or gearing elements is not critical to this invention.

Figure 4:
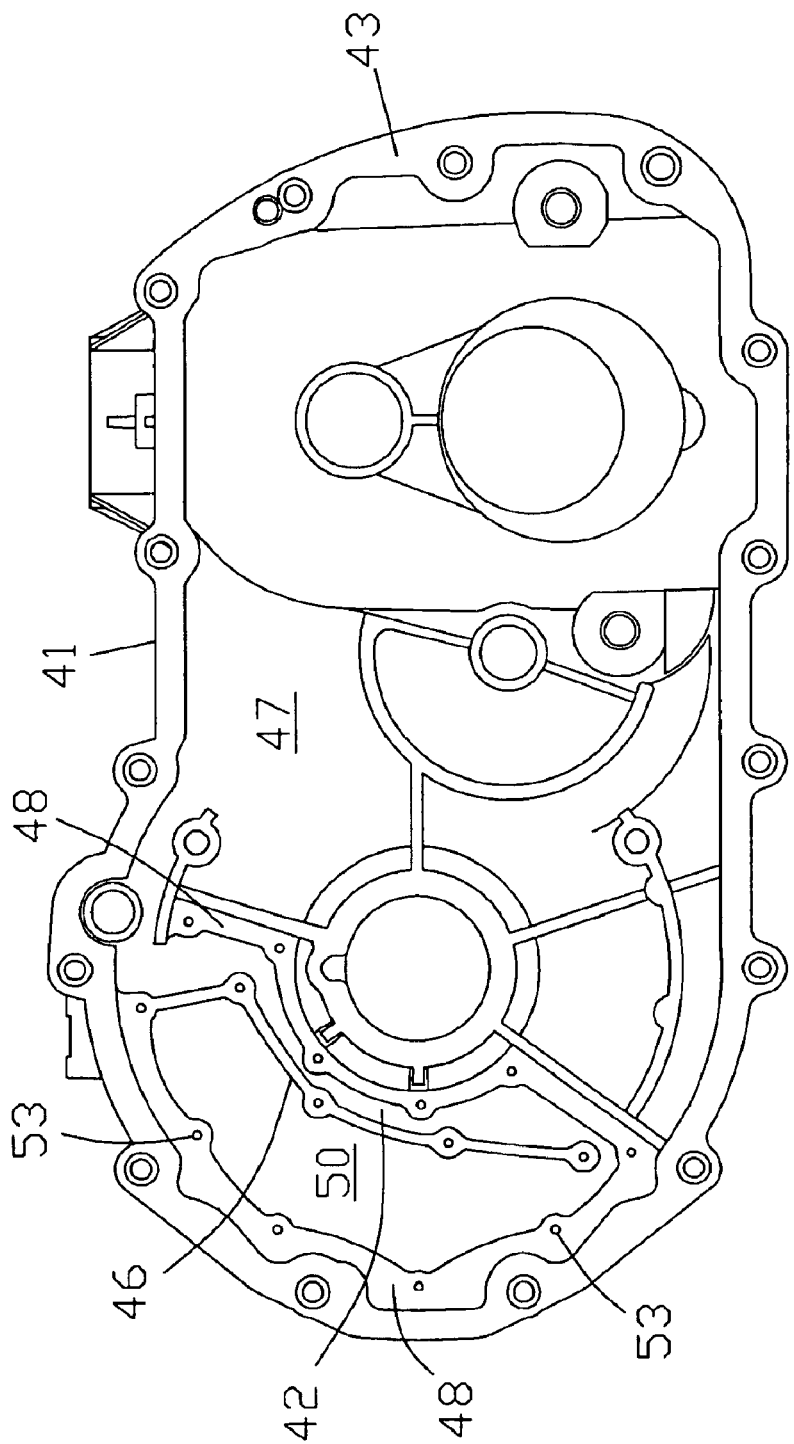
FIG. 4 is a side view of the housing of FIG. 3, with the hydrostatic and gearing elements removed.

In FIG. 3, bull gear 60 is partially cut away to show the invention. Plate 62 is secured to the inside of the main housing 41 through a plurality of fasteners 64. FIG. 4 shows main housing 41 without any of the hydrostatic or gearing elements mounted therein. Housing ribs 48 are shaped to create an internal expansion chamber 50. A plurality of openings 53 are formed in ribs 48 to receive fasteners 64 to secure cap 62 thereto, as shown in FIG. 3. In this design, transmission oil generally entirely fills sump 47.

In the embodiment shown in FIGS. 3 and 4, the siphoning element is tube 42 formed by rib 48 and inner rib 46 cooperating with the inner surface of cap 62. Openings 53 are also formed in inner rib 46 to permit cap 62 to be secured thereto also by fasteners 64, and a sealant would be preferably placed around the entire junction surface of ribs 46 and 48 with inner surface of cap 62 to form a complete seal. An appropriate silicon sealant that can adhere [1] to either or both the aluminum of the housing and plastic cap 62 and meet the temperature requirements of such a hydrostatic unit, such as Loctite 5900, so as to create an airtight gasket around the periphery, is preferred.

During operation of the transaxle oil will expand and be forced into the top of siphon tube 42 and flow downwardly therethrough to expansion chamber 50. As the unit cools and oil contracts, the oil stored in expansion chamber 50 will be forced into main sump 47 by the vacuum siphon effect. In this embodiment, cap 62 can be a simple flat plate-like structure, and would be preferably composed of plastic, although other materials could be used, and would preferably be approximately 0.050 inches thick. It will also be understood that while cap 62 has been shown in a vertical orientation with respect to the transaxle, it could be mounted horizontally within the housing and/or it could be used with housing elements being split horizontally as opposed to the vertical split shown in, e.g., FIG. 3.

Figure 5:
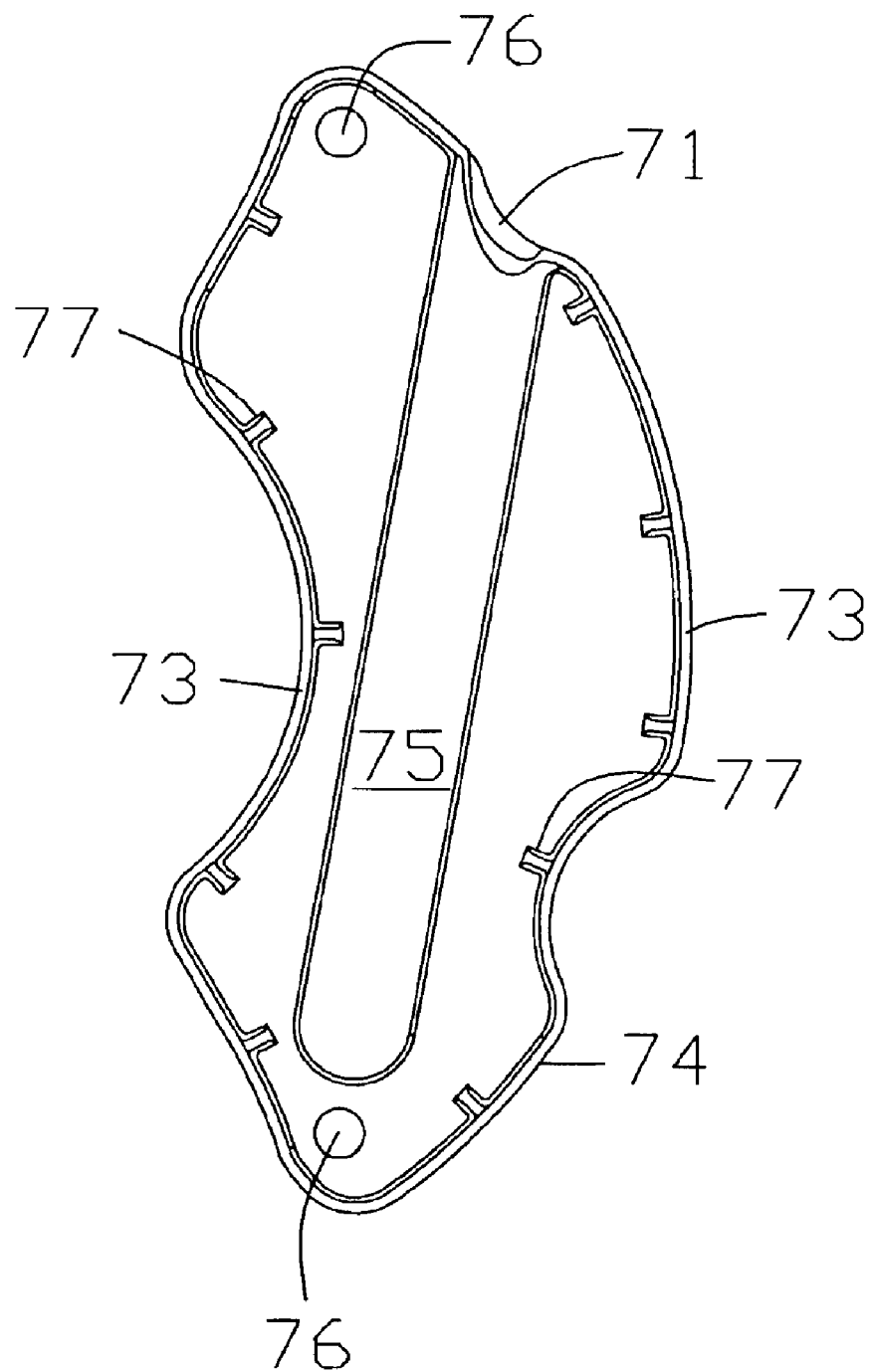
FIG. 5 is a perspective view of the outer side of the expansion tank cap having an integral siphon, in accordance with a second embodiment of the invention.
Figure 6:
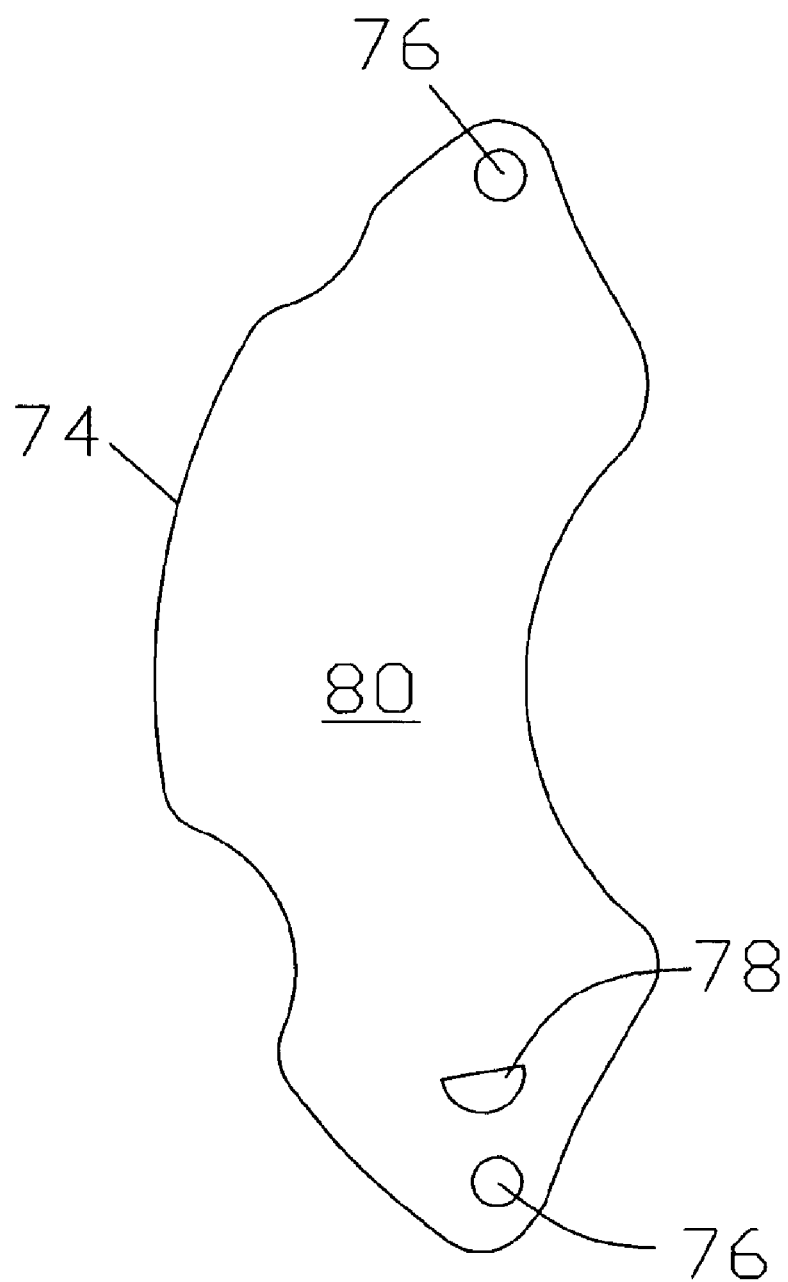
FIG. 6 is a plan view of the inner side of the expansion tank cap of FIG. 5.

In another embodiment, expansion chamber 50 could be formed without inner rib 46, with the siphon tube integrally formed in the cap. One such cap 74 is shown in FIGS. 5 and 6. Cap 74 has a different shape than cap 62 shown in the prior embodiment, as this is intended for a different shaped expansion chamber. Cap 74 is intended for use in a zero turn design which would include hydrostatic elements and gearing similar to that shown in FIG. 3, but with only a single output axle and thus no need for a differential. The cap shape is dictated by the shape of the expansion chamber which is itself dictated by shape of the housing, internal clearance issues and similar factors that are not critical to this invention. The integral siphon design described below and shown in FIGS. 5 and 6 could be used in the transaxle shown in FIG. 3, for example, in place of siphon tube 42 or with caps of other shapes.

Siphon 75 is integrally formed with cap 74, which is otherwise similar to cap 62 discussed above. It is also contemplated by this invention that siphon 75 could be a separate piece from cap 74 and secured thereto through adhesives or the like. Siphon 75 has a first opening 71 formed at the top of cap 74, with the orientation in FIG. 5 being the orientation of cap 74 as it would be used in a transaxle. Second opening 78 is formed at the bottom of cap 74 and is thus located at the bottom of the expansion chamber. Thus, oil flows through opening 71 through siphon 75 and out opening 78 when the oil is expanding and, when the unit cools and the oil contracts, the oil is siphoned in the opposite direction. As seen in FIG. 5, a rib 73 may be formed about the outer periphery of cap 74 for additional strength, with gussets 77 spaced to further support rib 73. This feature permits the use of a thinner cap 74, thus reducing cost.

In this embodiment, two holes 76 are formed in cap 74 and are used to secure cap 74 to the transmission housing. Since the expansion chamber must be sealed from the main sump, an adhesive is applied to the periphery of back surface 80 of cap 74 to secure it to the housing.

Figure 8:
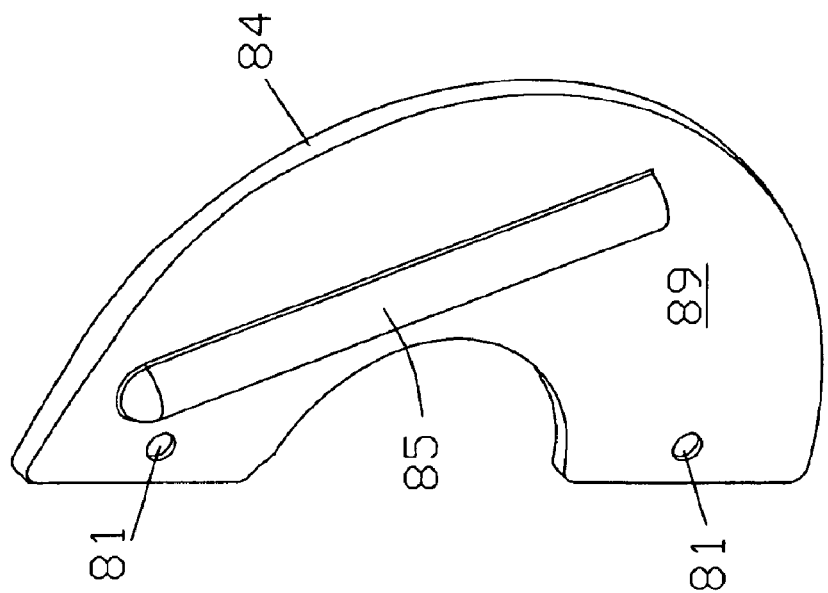
FIG. 8 is a perspective view of the inner surface of the cap shown in FIG. 7.
Figure 7:
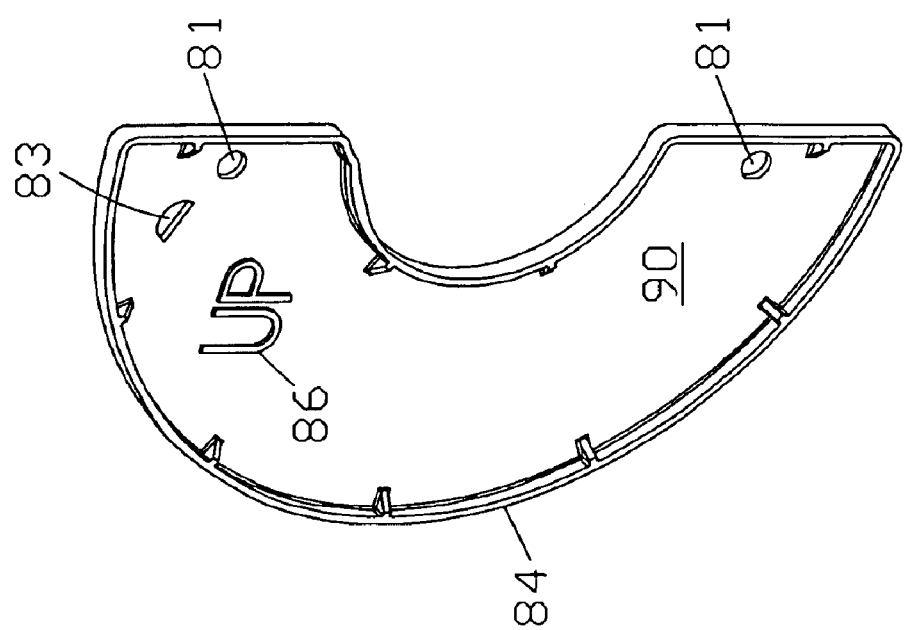
FIG. 7 is a perspective view of the outer surface of an expansion tank cap in accordance with a third embodiment of the invention.
Figure 9:
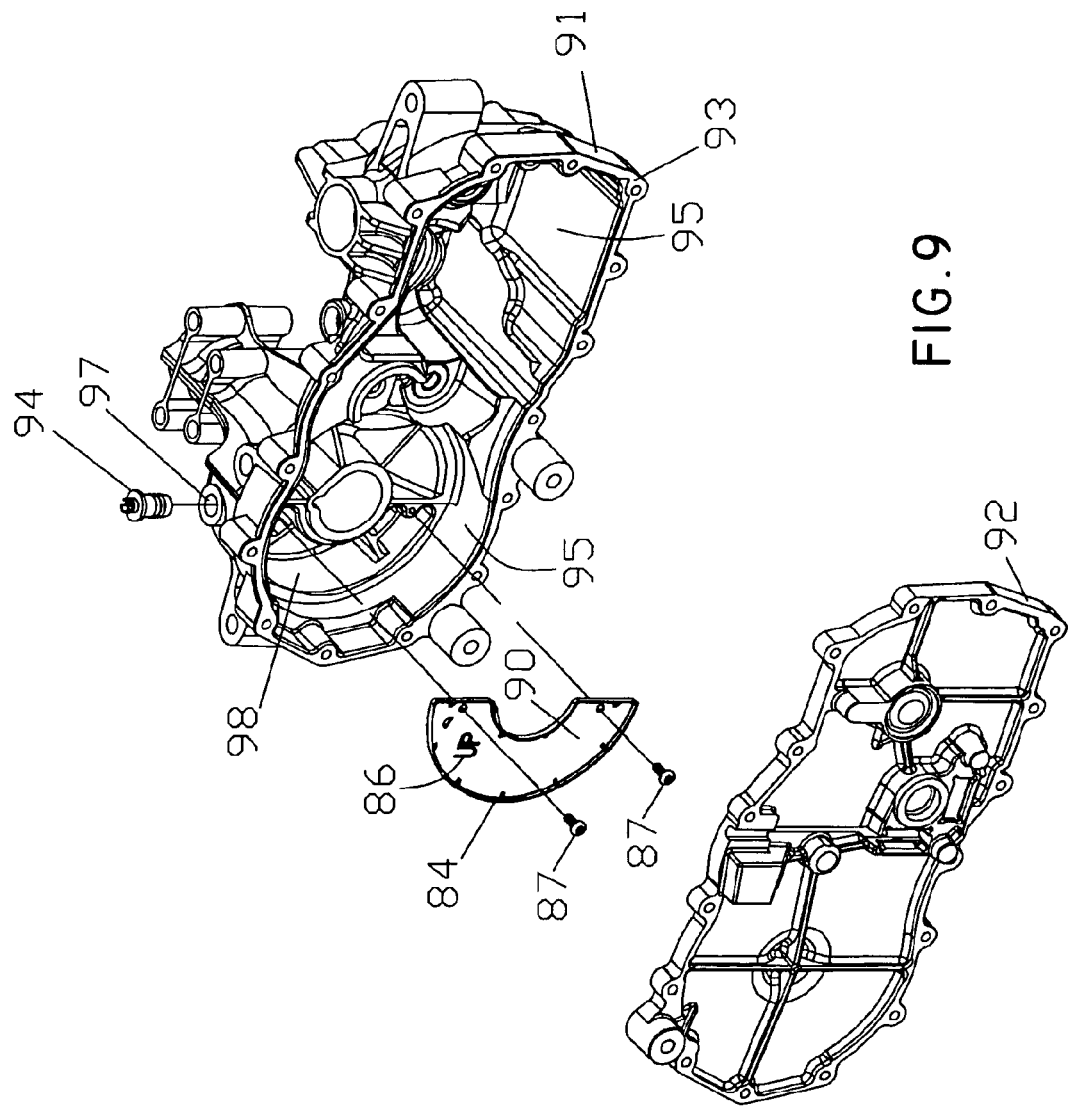
FIG. 9 is a an exploded perspective view of a hydrostatic transaxle housing having an internal expansion chamber for use with the cap of FIG. 7.

A third embodiment of this invention is shown in FIGS. 7, 8 and 9, which show expansion cap 84 having an inner surface 89 and an outer surface 90. In this embodiment, siphon 85 is integrally formed with cap 84 and is located on inner surface 89. Siphon opening 83 is formed on outer surface 90. Main housing 91 and side housing 92 are joined together along sealing surface 93 to form a main sump 95 for the hydraulic units and gearing, none of which is shown in this view for clarity. Expansion area 98 is formed within main housing 91 by ribs or other structure as disclosed above. A breather opening 97 is also formed in main housing 91 to allow expansion area 98 to be properly vented to the atmosphere. Breather vent 94 is secured in opening 97 preferably by threads.

Figure 10:
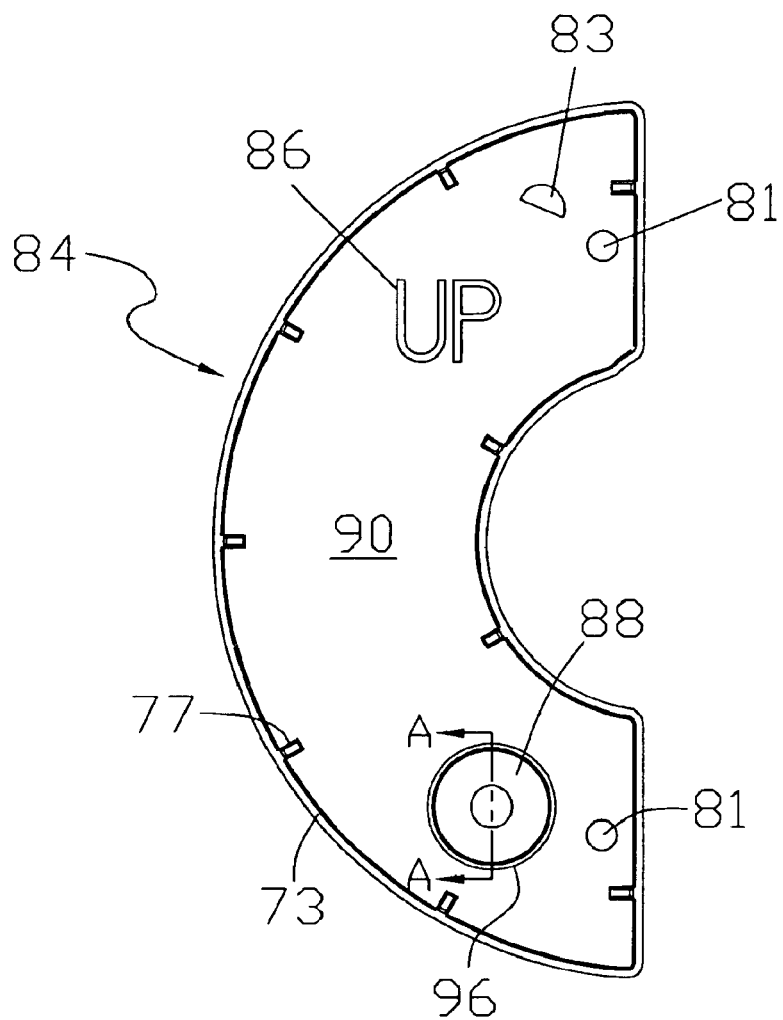
FIG. 10 is a plan view of another embodiment of the expansion tank cap.
Figure 11:
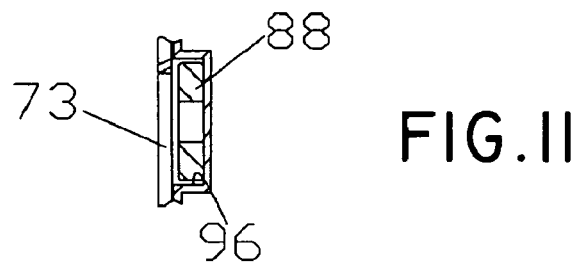
FIG. 11 is a cross-sectional view along the lines A—A in FIG. 10.

Cap 84 is secured to main housing 91 through fasteners 87 through openings 81. As discussed above, a sealant would also be placed around the edges of inner surface 89 to fully seal the expansion area 98 from the main sump 95. A benefit of placing the siphon on the inner surface 89 is that it permits an outer surface 90 to be generally flat. During assembly, it is preferred to ensure that the expansion area is fully sealed, and this can be tested by using a device to apply vacuum or air pressure to siphon opening 83, with breather opening 97 or breather vent 94 blocked. A flat outer surface 90 makes sealing such a device against cap 84 easier. As also shown in FIGS. 7 and 8, external marking indicia 86 can be formed on cap 84 for use during assembly. FIGS. 10 and 11 show another embodiment of expansion cap 84, where magnet pocket 96 is formed in outer surface 90 of cap 84 to secure magnet 88 therein. Magnet 88 assists in the filtration of the hydraulic oil by trapping ferromagnetic metal shavings and debris.

The embodiments described above and shown in the figures are intended to be exemplary and should not be read to limit the invention, which is defined by the appended claims.

We claim:

1. An axle driving apparatus comprising:
   a housing having an internal surface and forming an oil sump;
   a hydrostatic transmission mounted in the sump;
   a cap having a generally flat inner surface and a generally flat outer surface, where the inner surface is secured to the internal surface of the housing to create an expansion area inside the housing separate from the oil sump; and a siphon integrally formed on one of the surfaces of the cap to pert oil to flow between the, oil sump and the expansion area.

2. An axle driving apparatus as set forth in claim 1, wherein the siphon is integrally formed on the inner surface of the cap.

3. An axle driving apparatus as set firth in claim 1, wherein the siphon is integrally formed on the outer surface of the cap.

4. An axle driving apparatus as set forth in claim 1, wherein the siphon is formed by a rib formed on the housing and the inner surface of the cap.

5. An axle driving apparatus as set forth in claim 1, further comprising a differential mounted in the sump.

6. An axle driving apparatus a, set forth in claim 1, further comprising a magnet mounted on said cap.

7. An apparatus for driving at least one output axle, comprising:

a housing composed of at least two casing members joined together at a plane perpendicular to the output axle, the housing having an inner surface forming an oil sump;

a hydrostatic transmission mounted in the oil sump;

one of the casing members having ribs formed on the inner surface thereof;

a plate secured to the ribs to form an expansion area that is scaled from the oil sump;

a siphon integrally formed with the plate and connecting the oil sump to the expansion area.

8. An axle driving apparatus as set forth in claim 7, wherein the siphon is integrally formed on the inner surface of the plate.

9. An axle driving apparatus as set forth in claim 7, wherein the siphon is integrally formed on the outer surface of the plate.

10. An axle driving apparatus as set forth in claim 7, further comprising a differential mounted in the sump.

11. An axle driving apparatus as set forth in claim 7, further comprising a magnet mounted on the plate.

12. An axle driving apparatus as set forth in claim 11, wherein the magnet is mounted on the outer surface of the plate.

13. An axle driving apparatus comprising:

a housing having an internal surface forming an oil sump;

a hydrostatic transmission mounted in the sump and comprising a hydraulic pump and hydrostatic motor mounted on a center section;

at least one reduction gear mounted in the housing and drivingly connected to the hydraulic motor;

a single output axle drivingly engaged to said at least one gear and extending from one side of the housing;

a plate having an inner surface and an outer surface, where the inner surface is secured to a portion of the internal surface of the housing to form an expansion area whereby the expansion area is scaled from the oil sump; and a siphon integrally formed with the plate to permit oil to flow between the oil sump and the expansion area.

14. An axle driving apparatus as set forth in claim 13, wherein the siphon is integrally formed on the inner surface of the plate.

15. An axle driving apparatus as set forth in claim 14, further comprising a magnet mounted on the plate.

16. An axle driving apparatus as set forth in claim 15, wherein the magnet is mounted on the outer surface of the plate.

17. An axle driving apparatus as set forth in claim 13, wherein the siphon is integrally formed on the outer surface of the plate.

18. An axle driving apparatus as set forth in claim 13, wherein the siphon is formed by a rib formed on the housing and the inner surface of the plate.

* * * * *

UNITED STATES PATENT AND TRADEMARK OFFICE
CERTIFICATE OF CORRECTION

PATENT NO. : 6,843,747 B1
DATED : January 18, 2005
INVENTOR(S) : Phanco, Rawski and Ward It is certified that error appears in the above-identified patent and that said Letters Patent is hereby corrected as shown below:

Column 5,
Line 5, replace "cap to pert oil to flow between the, oil sump" with -- cap to permit oil to flow between the oil sump --.
Line 18, replace "a," with -- as --.
Line 31, replace "scaled" with -- sealed --.

Column 6,
Line 11, replace "hydrostatic" with -- hydraulic --.
Line 20, replace "scaled" with -- sealed --.

Signed and Sealed this

Nineteenth Day of April, 2005

JON W. DUDAS
*Director of the United States Patent and Trademark Office*